US010422176B2

(12) United States Patent
Carli et al.

(10) Patent No.: US 10,422,176 B2
(45) Date of Patent: Sep. 24, 2019

(54) DEVICE FOR OPENING A DOOR OF A DISHWASHER

(71) Applicant: ILLINOIS TOOL WORKS INC., Glenview, IL (US)

(72) Inventors: Pierluigi Carli, San Mauro Torinese (IT); Gianbattista Ala, Volpiano (IT); Luca Gennaretti, Rivoli (IT)

(73) Assignee: ILLINOIS TOOL WORKS INC., Glenview, IL (US)

( * ) Notice: Subject to any disclaimer, the term of this patent is extended or adjusted under 35 U.S.C. 154(b) by 479 days.

(21) Appl. No.: 14/442,119

(22) PCT Filed: Nov. 27, 2013

(86) PCT No.: PCT/US2013/072378
§ 371 (c)(1),
(2) Date: May 12, 2015

(87) PCT Pub. No.: WO2014/088910
PCT Pub. Date: Jun. 12, 2014

(65) Prior Publication Data
US 2016/0130854 A1 May 12, 2016

(30) Foreign Application Priority Data

Dec. 7, 2012 (IT) .............................. TO2012A1052
Sep. 17, 2013 (IT) .............................. TO2013A0755

(51) Int. Cl.
*E05F 15/611* (2015.01)
*E05F 15/619* (2015.01)
(Continued)

(52) U.S. Cl.
CPC ......... *E05F 15/611* (2015.01); *A47L 15/4259* (2013.01); *F16H 19/04* (2013.01);
(Continued)

(58) Field of Classification Search
CPC .... A47L 15/488; A47L 15/4257; A47L 15/42; A47L 15/4246; A47L 1501/22;
(Continued)

(56) References Cited

U.S. PATENT DOCUMENTS 4,872,239 A * 10/1989 Ferguson ................ E05F 1/105
16/64
8,469,469 B2 * 6/2013 Kim ..................... E05B 17/0029
312/319.5

(Continued)

FOREIGN PATENT DOCUMENTS

EP 2130476 A2 12/2009
EP 2210547 A1 7/2010
(Continued)

OTHER PUBLICATIONS

English Translation of JP2003-240424 (Year: 2003).*
English Translation of JP2001-280827 (Year: 2001).*
ISR and WO for PCT/US2013/072378 dated Feb. 10, 2014.

*Primary Examiner* — Zakaria Elahmadi
*Assistant Examiner* — Bobby Rushing, Jr.
(74) *Attorney, Agent, or Firm* — Piloff Passino & Cosenza LLP; Martin J. Cosenza

(57) ABSTRACT

A device for opening a door includes an electric motor on a base, a slider movable relative to the base along a rectilinear direction between a rest position and an open position, and a rod pushing against the door and movable relative to the base and the slider along the rectilinear direction between a retracted position and an extracted position. An actuating element resiliently pushes the rod towards the extracted position. A gearwheel transmission is arranged between the electric motor and a transmission device to cause movement of the slider into the open position. The gearwheel transmission includes a gearwheel having a non-toothed segment which disengages the slider from the electric motor when the (Continued)

slider reaches the open position. A recall element recalls the slider towards the rest position or the rod towards the retracted position when the non-toothed segment disengages the slider from the electric motor.

26 Claims, 9 Drawing Sheets

(51) Int. Cl.
*F16H 19/04* (2006.01)
*A47L 15/42* (2006.01)

(52) U.S. Cl.
CPC ..... *A47L 2501/22* (2013.01); *E05Y 2900/304* (2013.01); *F16H 2019/046* (2013.01)

(58) Field of Classification Search
CPC ... A47B 88/457; A47B 88/463; A47B 88/467; E05F 15/611; E05F 15/619; E05Y 2900/304; F16H 19/04; F16H 2019/046
USPC ................. 312/228, 319.5–319.8, 326, 405; 134/56 D, 57 D, 58 D; 74/29, 30, 84 R, 74/88, 89.1, 89.11, 89.17, 128, 130, 131, 74/828, 289
See application file for complete search history.

(56) References Cited

U.S. PATENT DOCUMENTS

| | | | |
|---|---|---|---|
| 9,695,624 B2 * | 7/2017 | Heydel | ............... E05F 15/70 |
| 2011/0279004 A1 | 11/2011 | Assmann et al. | |
| 2013/0057134 A1 | 3/2013 | Kilic | |

FOREIGN PATENT DOCUMENTS

| | | | |
|---|---|---|---|
| JP | 2001280827 A | * | 10/2001 |
| JP | 2003240424 A | * | 8/2003 |
| WO | 2011003714 A1 | | 1/2011 |
| WO | 2011141542 A1 | | 11/2011 |

* cited by examiner

DEVICE FOR OPENING A DOOR OF A DISHWASHER

RELATED APPLICATIONS

The present application is a National Phase of International Application Number PCT/US2013/072378 filed Nov. 27, 2013 and claims priority to Italian Application Number TO2013A000755 filed Sep. 17, 2013 and Italian Application Number TO2012A001052 filed Dec. 7, 2012.

FIELD OF THE INVENTION

The present invention relates to a device for automatically opening the door of a dishwasher at the end of a washing cycle.

DESCRIPTION OF THE RELATED ART

Opening of the dishwasher door at the end of the washing cycle allows the steam to escape and facilitates drying of the dishware.

Dishwashers equipped with a device which automatically opens the door at the end of the washing cycle are known. The devices for opening the door of the dishwasher of the known type are equipped with a rod which is operated by an electrical actuator and which pushes against the inner side of the door until it causes the door to be released and opened. After performing opening, the rod is retracted back into an initial position by operating the actuator in the reverse direction. One of the drawbacks of the known solutions is that retraction of the rod back into the initial position is slow. Until retraction of the rod into the initial position has been completed the rod projects from the top edge of the dishwasher. The slowness of the rod retraction operation is a drawback because, during retraction, the rod is subject to the risk of breakage or jamming since it projects from the top edge of the dishwasher.

OBJECT AND SUMMARY OF THE INVENTION

The object of the present invention is to provide a device for automatically opening a dishwasher door which is able to solve the problems of the known solutions.

According to the present invention, the object is achieved by a device having the characteristic features forming the subject of claim 1.

The claims form an integral part of the teaching provided in relation to the invention.

BRIEF DESCRIPTION OF THE DRAWINGS

The present invention will now be described in detail with reference to the accompanying drawings provided purely by way of a non-limiting example in which.

DESCRIPTION OF EMBODIMENTS OF THE INVENTION

Figure 1:
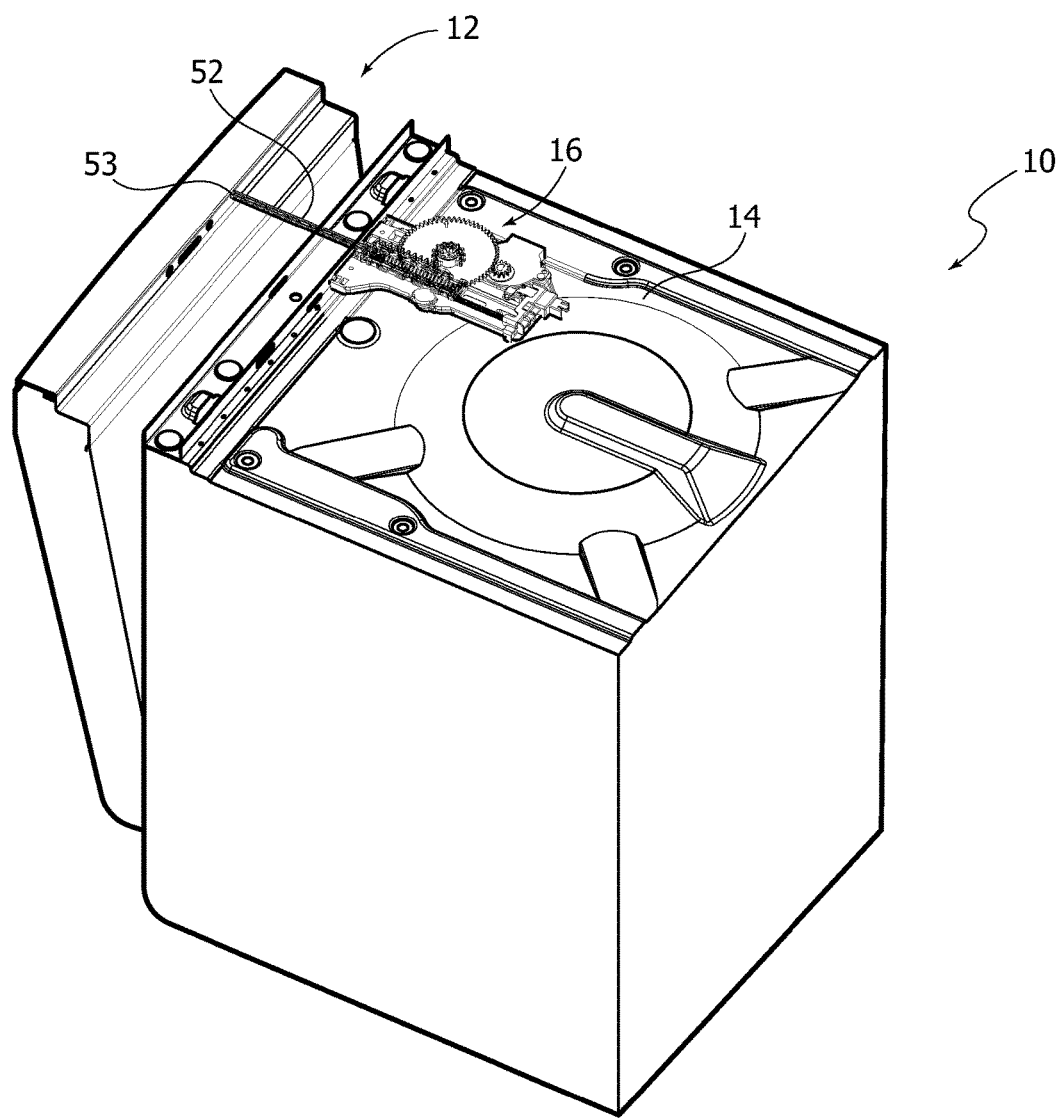
FIG. 1 is a perspective view of a dishwasher provided with a device according to the present invention.

With reference to FIG. 1, 10 denotes a domestic dishwasher having a door 12 hinged with the body of the dishwasher about a bottom horizontal axis. The dishwasher 10 has a top wall 14 on which a device 16 for automatically opening the door 12 at the end of a washing cycle is mounted.

Figure 2:
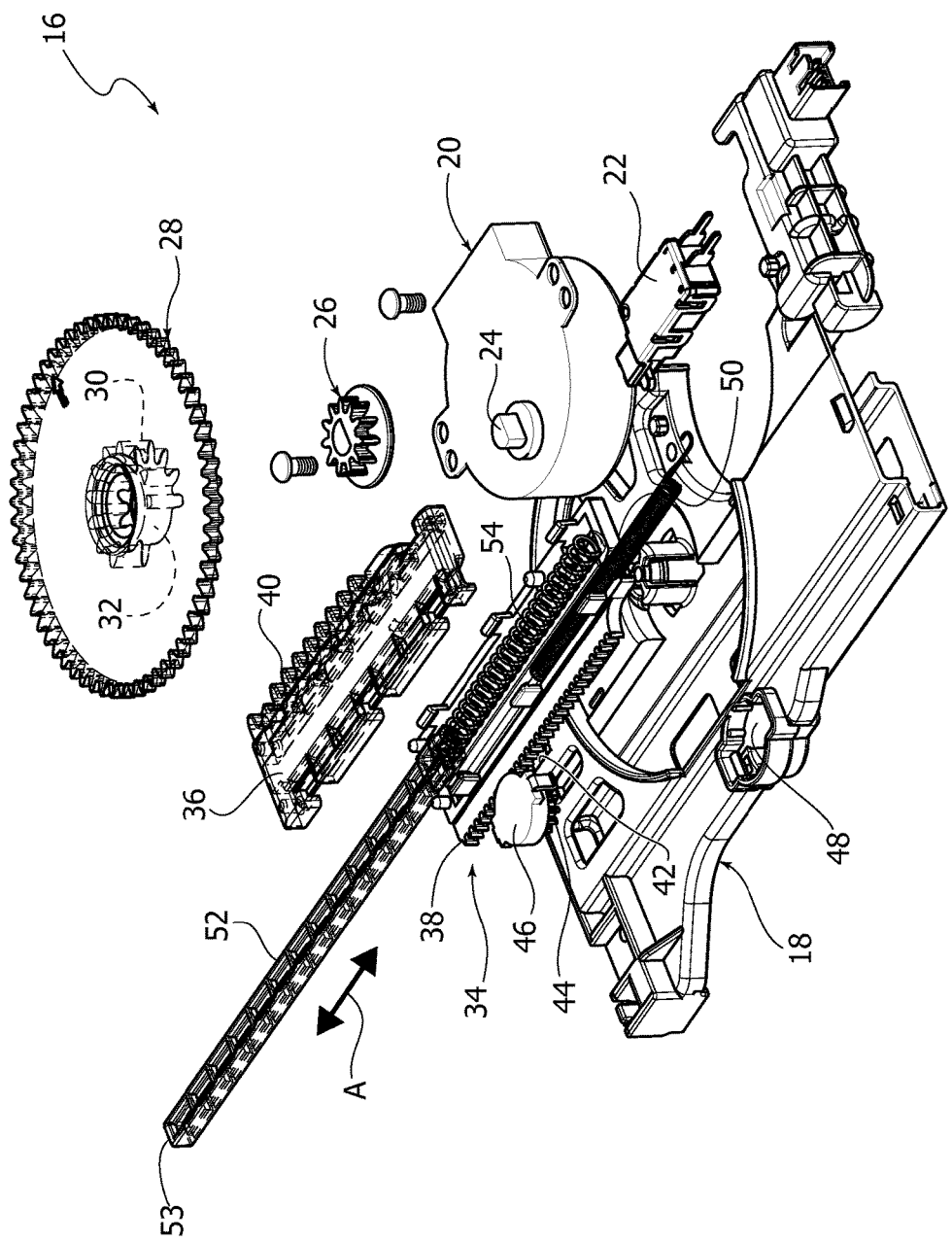
FIG. 2 is an exploded perspective view of a first embodiment of a device according to the invention.
Figure 3:
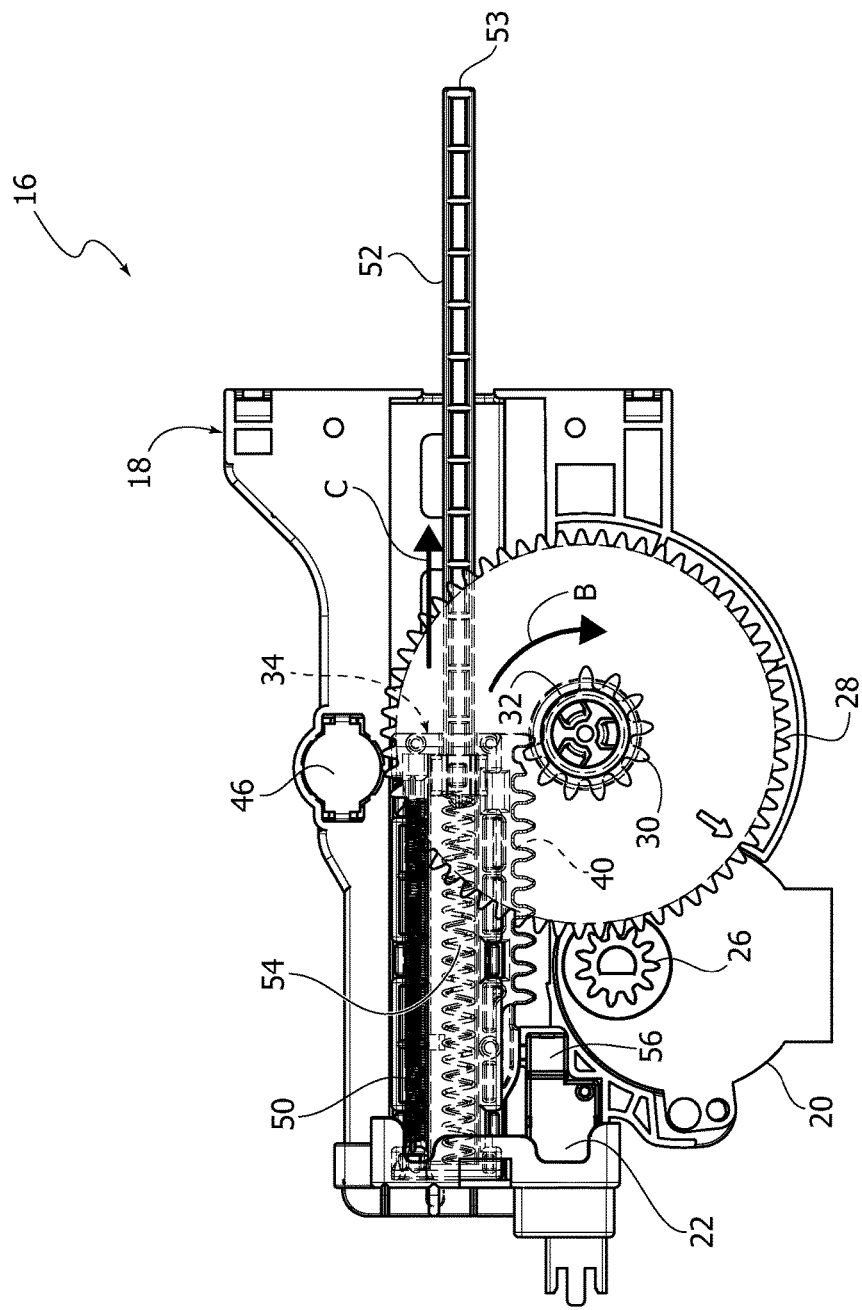
FIG. 3 is a plan view of the device according to FIG. 2 in an initial position.

With reference to FIG. 2, the opening device 16 comprises a base 18 intended to be fixed to the top wall 14 of the dishwasher 10. The base 18 supports an electric motor 20 connected by means of a connector 22 to the power supply and control circuit of the dishwasher 10. The electric motor 20 has an output shaft 24 on which a first gearwheel 26 is fixed. The first gearwheel 26 meshes with a second gearwheel 28 having a diameter much greater than the diameter of the first gearwheel 26 so as to provide a reduction in the output speed of the motor 20. The second gearwheel 28 is coaxially locked with or stationary in relation to a third gearwheel 30. The second gearwheel 28 and the third gearwheel 30 may be formed as one piece by means of plastic injection-molding. The third gearwheel 30 has a non-toothed segment 32, the function of which will become clear from the continuation of the description.

The device 16 comprises a slider 34 movable along a rectilinear direction A perpendicular to the axis of rotation of the gearwheels 28, 30. The slider 34 may be formed by two elements 36, 38 fixed together by means of snap-engagement. The slider 34 is guided with respect to the base 18 so as to be able to move only in the direction A between an initial position and an open position. The slider 34 has a first rack 40 which meshes with the third gearwheel 30. Preferably, the slider 34 has a second rack 42 which actuates, by means of a gearwheel 44, a rotary damper 46 housed inside a seat 48 of the base 18. In this embodiment, a transmission device for causing the movement of the slider 34 from the rest position into the open position comprises the first rack 40 fixedly attached to the slider 34.

The opening device 16 comprises a resilient recall element 50 arranged between the slider 34 and the base 18 and tending to recall the slider 34 towards an initial position in which the slider 34 is retracted with respect to the base 18. In the example shown, the resilient recall element 50 is a helical extension spring housed between the two parts 36, 38 of the slider 34. The resilient recall element 50 has a first end fixed to the slider 34 and a second end fixed to the base 18. One part of the resilient element 50 projects outside of the slider 34 on the opposite side to the door 12.

The opening device 16 comprises a rod 52 extending in the direction A. The rod 52 is movable with respect to the base 18 between a retracted position and an extracted position. The slider 34 and the rod 52 are movable with respect to each other in the direction A. In the example shown in FIGS. 2-5, the rod 53 is mounted slidably between the two parts 36, 38 of the slider 34. The rod 52 has a distal end 53 which during use is intended to push against an inner top edge of the door 12.

A resilient actuating element 54 is arranged between the rod 52 and the slider 34 and tends to push the rod 52 towards the extracted position. In the example shown in FIGS. 2-5, the resilient actuating element 54 is a helical compression spring housed between the two parts 36, 38 of the slider 34. In the example shown in FIGS. 2-5, the resilient actuating element 54 is arranged between the proximal end of the rod 52 and the opposite side of the slider 34.

The operating principle of the device 16 is now described. During the operating cycle of the dishwasher 10 the device 16 is deactivated and is in the initial position shown in FIG. 3. In this condition, the slider 34 is kept in a retracted position by the resilient recall element 50. The distal end 53 of the rod 52 rests against the inner top edge of the door 12.

When the operating cycle of the dishwasher 10 terminates, the motor 20 of the device 16 is activated. The motor 20 rotationally actuates the gearwheels 26, 28, 30 which form the speed reducer device. The third gearwheel 30 meshes with the rack 40. Therefore, the rotation of the third wheel 30 in the direction indicated by the arrow B in FIG. 3 causes a movement of the slider 34 in the direction indicated by the arrow C. Initially, the rod 52 remains stationary, while the slider 34 moves in the direction C. The resilient actuating element 54 is compressed and stores up elastic energy. When the force of the resilient actuating element 54 is greater than the retaining force of the hook on the door 12, the door 12 opens. During this stage, any pushing force exerted on the door 12 in the closing direction would be absorbed by the resilient actuating element 54, without damaging the transmission mechanism of the device 16.

Figure 4:
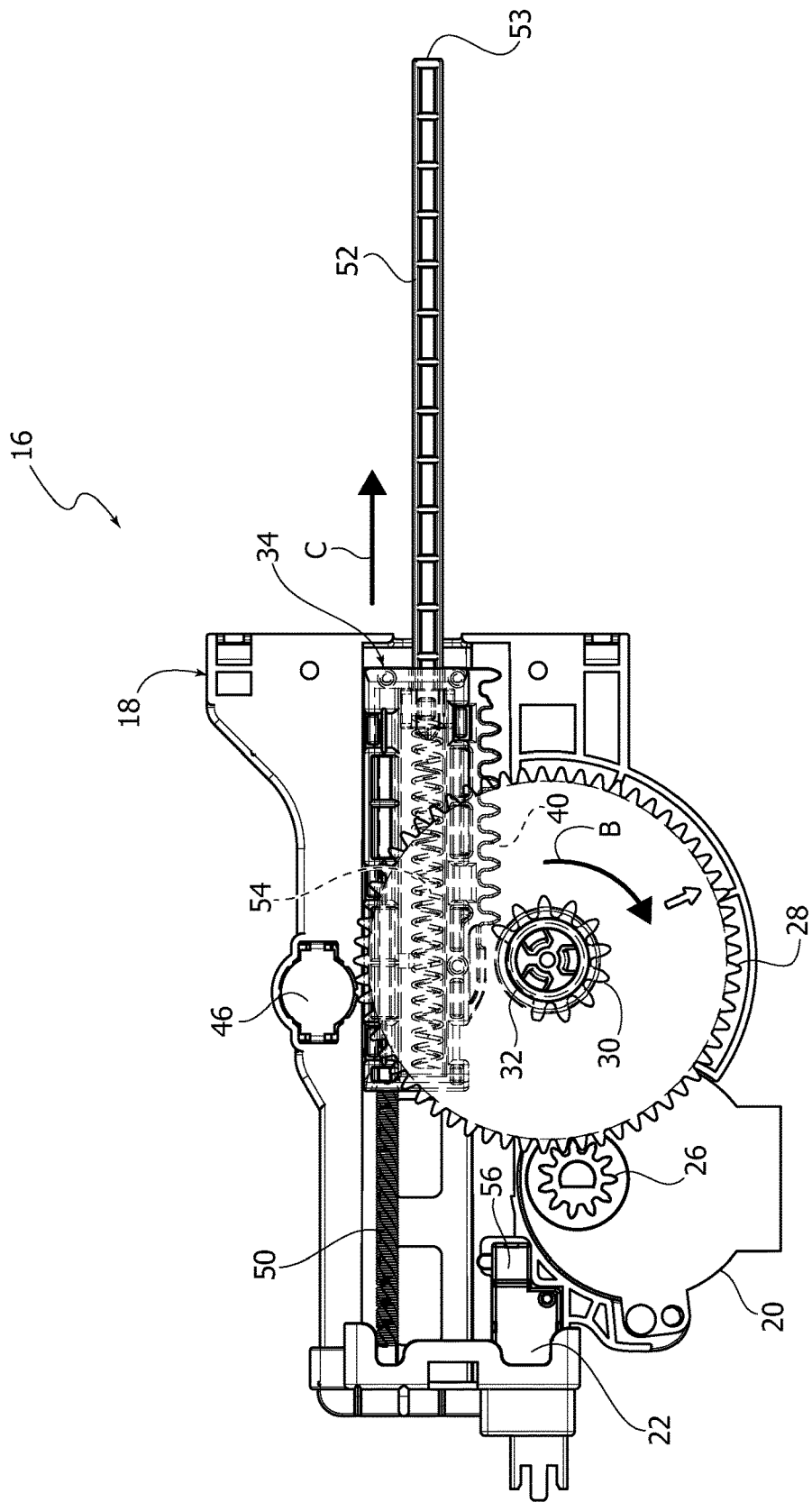
FIG. 4 is a plan view of the device according to FIG. 2 in the open position.

The outwards movement of the slider 34 and the rod 52 continues until the position shown in FIG. 4 is reached. In this condition the door 12 of the dishwasher 10 is slightly open as shown in FIG. 1.

Figure 5:
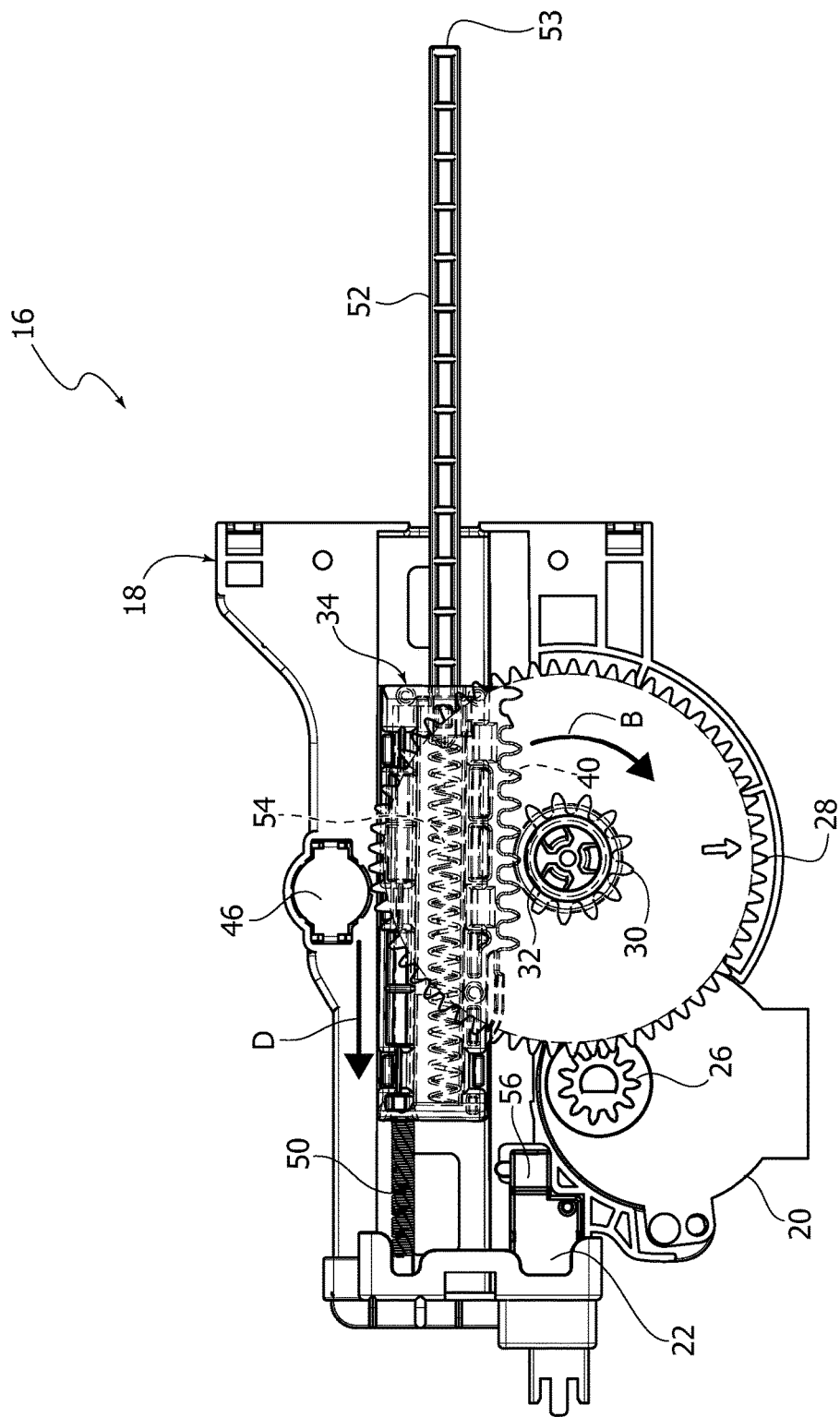
FIG. 5 is a plan view which shows the return movement of the device according to FIG. 2 back into the initial position.
Figure 6:
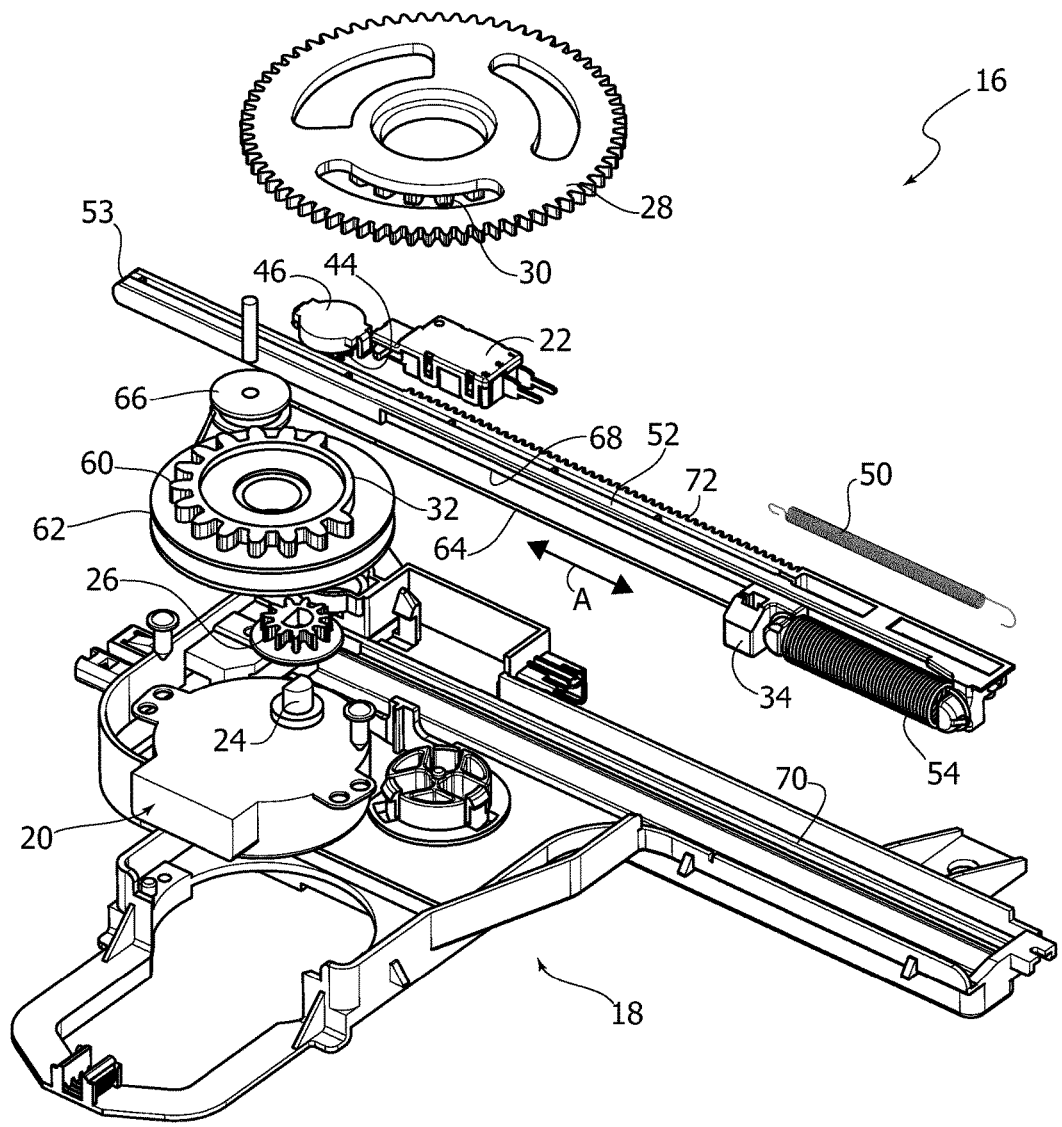
FIG. 6 is an exploded perspective view of a second embodiment of a device according to the invention.

During the movement of the slider 34 in the direction C, the resilient recall element 50 is extended. The rotation of the third gearwheel 30 in the direction B continues until the non-toothed segment 32 of the third gearwheel 30 is situated opposite the rack 40 of the slider 34, as shown in FIG. 5. In this condition, the rack 40 is disengaged from the actuating gearwheel 30. Then, the slider 34 moves instantaneously in the direction indicated by the arrow D in FIG. 5 under the recall action of the resilient recall element 50. The return movement of the slider 34 into the initial position is damped by the damper 46 which is engaged with the second rack 42 of the slider 34. A proximity switch 56 detects the return movement of the slider 34 into the initial position and deactivates the motor 20. At this point the device 16 is located again in the initial position where the rod 52 is retracted with respect to the front edge of the dishwasher 10.

FIGS. 6 to 9 show a second embodiment of an opening device 16 according to the present invention. The parts which correspond to those described above are indicated by the same reference numbers.

The opening device 16 comprises a base 18 intended to be fixed to the top wall 14 of the dishwasher 10. The base supports an electric motor 20 connected by means of a connector 22 to the power supply and control circuit of the dishwasher 10. The electric motor 20 has an output shaft 24 on which a first gearwheel 26 is fixed. The first gearwheel 26 meshes with a second gearwheel 28 having a diameter much greater than the diameter of the first gearwheel 26 so as to provide a reduction in the output speed of the motor 20. The second gearwheel 28 is coaxially locked with or stationary in relation to a third gearwheel 30 having a diameter smaller than the diameter of the second gearwheel 28. The second gearwheel 28 and the third gearwheel 30 may be formed as one piece by means of plastic injection-molding.

The third gearwheel 30 meshes with a fourth gearwheel 60. Preferably, the fourth gearwheel 60 has a diameter greater than the diameter of the third gearwheel 30 so as to perform a second speed reduction. The fourth gearwheel 60 has a non-toothed segment 32.

The fourth gearwheel 60 is coaxially locked with or stationary in relation to a pulley 62 to which a first end of a flexible cable 64 is fixed. A second end of the flexible cable 64 is fixed to a slider 34. The flexible cable 64 passes around an idle drive pulley 66. The slider 34 engages slidably along a longitudinal direction A with a longitudinal guide 68 formed on a rod 52 extending in the longitudinal direction A. The rod 52 is movable with respect to the base 18 between a retracted position and an extracted position. The rod 52 is guided in the direction A by a guide 70 formed in the base 18. The slider 34 and the rod 52 are movable with respect to each other in the direction A. The rod 52 has a distal end 53 which during use is intended to push against an inner top edge of the door 12. The rod 52 has a rack 72 which meshes with a gearwheel 44 of a rotary damper 46 mounted on the base 18. In this embodiment, a transmission device for causing the movement of the slider 34 from the rest position into the open position comprises the pulley 62 and the flexible cable 64.

The opening device 16 comprises a resilient recall element 50 arranged between the rod 52 and the base 18. In the example shown in FIGS. 6-9, the resilient recall element 50 is a helical extension spring having a first end fixed to the rod 52 and a second end fixed to the base 18. The resilient recall element 50 tends to recall the rod 52 into its retracted position.

A resilient actuating element 54 is arranged between the slider 34 and the rod 52. In the example shown in FIGS. 6-9, the resilient actuating element 54 is formed by a helical extension spring having a first end fixed to the slider 34 and a second end fixed to the rod 52.

The operating principle of the device 16 of this second embodiment of the invention is now described.

Figure 7:
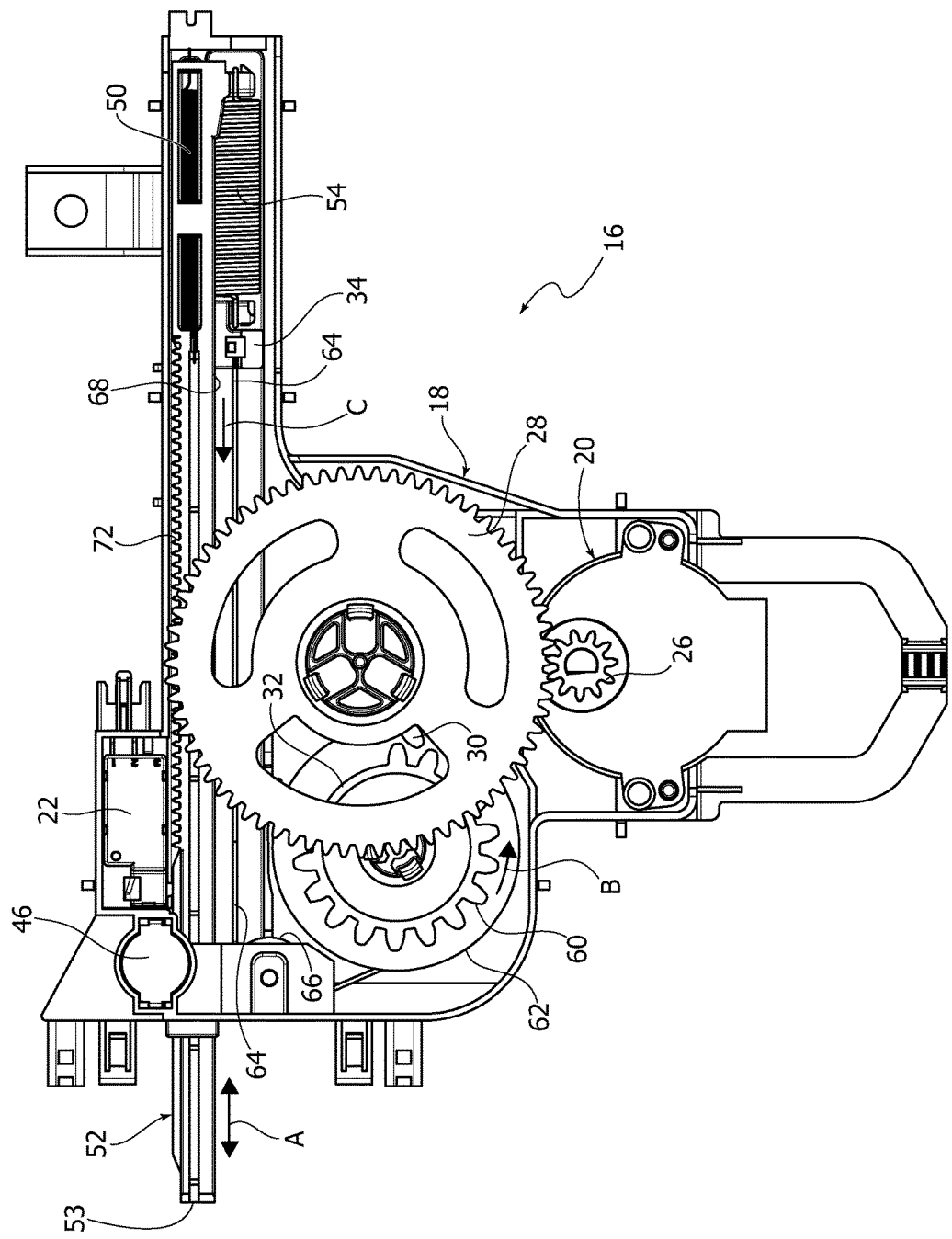
FIG. 7 is a plan view of the device according to FIG. 6 in an initial position.

During the operating cycle of the dishwasher 10 the device 16 is deactivated and is in the initial position shown in FIG. 7. In this condition, the rod 52 is kept in the retracted position by the resilient recall element 50. The distal end 53 of the rod 52 rests against the inner top edge of the door 12.

Figure 8:
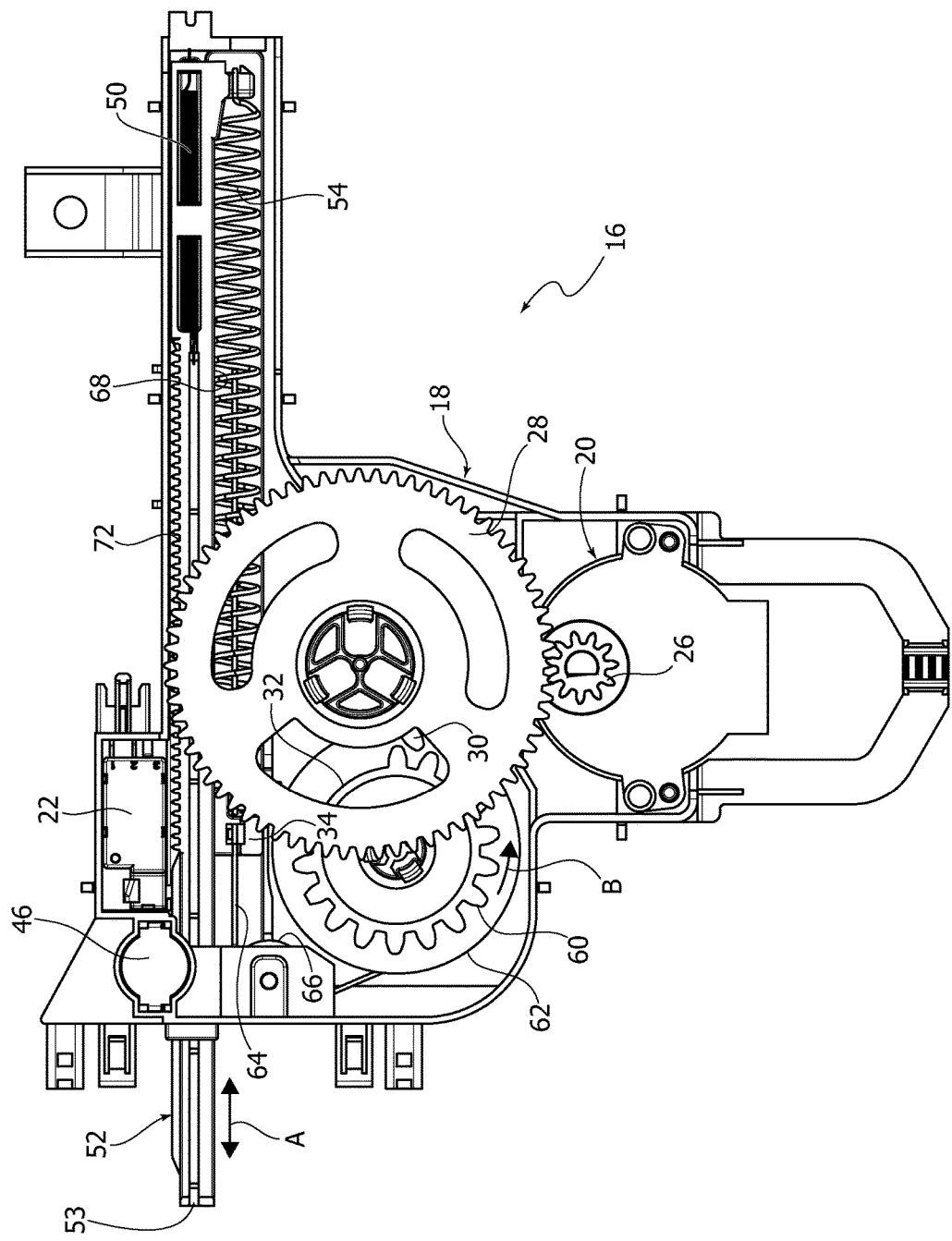
FIG. 8 is a plan view of the device according to FIG. 6 in a position at the start of opening.

When the operating cycle of the dishwasher 10 terminates, the motor 20 of the device 16 is activated. The motor 20 rotationally actuates the fourth gearwheel 60 in the direction indicated by the arrow B by means of the chain of gearwheels 26, 28, 30 which forms a speed reducer device. The pulley 62, which is integral with the fourth gearwheel 60, winds the flexible cable 64 and moves the slider 34 with respect to the pulley 52 in the direction indicated by the arrow C. Initially, the rod 52 remains stationary, while the slider 34 moves in the direction C. The resilient actuating element 54 extends and stores up elastic energy. FIG. 8 shows the fully extended condition of the resilient actuating element 54. When the resilient actuating element 54 is in the fully extended position, the force of the resilient actuating element 54 is greater than the retaining force of the hook of the door 12. In this condition the door 12 opens and the rod 52 moves into the extracted position shown in FIG. 9. In this condition the door of the dishwasher is slightly open.

Figure 9:
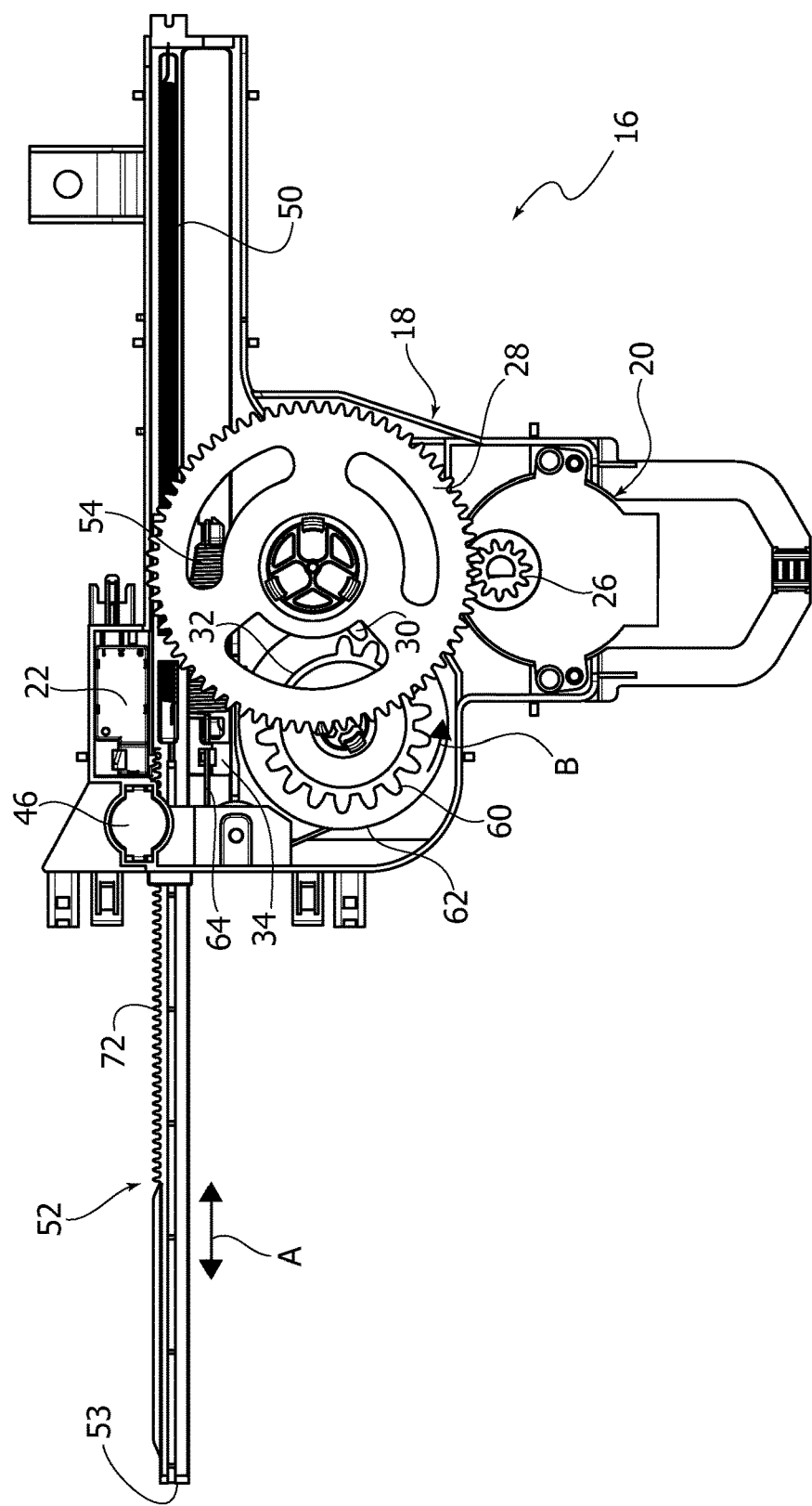
FIG. 9 is a plan view of the device according to FIG. 6 in the open position.

When the rod 52 is in the extracted position shown in FIG. 9, the resilient recall element 50 is extended. The rotation of the fourth gearwheel 60 in the direction B continues until the non-toothed segment 32 of the fourth gearwheel 60 is situated opposite the third gearwheel 30. In this condition, the fourth gearwheel 60 disengages from the third gearwheel 30. When the fourth gearwheel 60 is disengaged from the third gearwheel 30, the pulley 62 is free to rotate in the opposite direction to the direction indicated by the arrow B. The resilient recall element 50 recalls the rod 52 into the retracted position and the device 16 returns into the initial position shown in FIG. 7.

The return movement of the rod 52 from the extracted position into the retracted position is damped by the damper 46. The damper 46 also dampens the movement of the rod 52 from the retracted position into the extracted position under the thrust of the resilient actuating element 54. A proximity switch detects the return movement of the rod 52 into the retracted position and deactivates the motor 20.

The instantaneous return movement of the rod 52 into the retracted position immediately after opening of the door is particularly advantageous. If the return movement of the rod 52 were to occur at the same speed as the opening movement, the rod 52 would be situated for a relatively long period of time beyond the open top edge of the dishwasher 10 and would be exposed to the risk of breakage. With the solution according to the present invention the rod 52 returns instantaneously into the retracted position under the recall force of the resilient recall element 50 as soon as the non-toothed segment 32 disengages the slider from the motor 20.

A further advantageous aspect of the device according to the present invention is that most of the opening operation is not noticed by the user. In fact, only at the end of the opening cycle does the resilient actuating element 54 exceed the force of the retaining bolt of the door and instantaneously push the door into the open position.

Obviously, without affecting the principle of the invention, the constructional details and embodiments may be greatly modified with respect to that described and illustrated without thereby departing from the scope of the invention as defined by the following claims.

What is claimed:

1. A device for opening a door of a dishwasher, comprising:
    a base,
    an electric motor mounted on the base,
    a slider movable with respect to the base along a rectilinear direction between a rest position and an open position,
    a rod having a distal end configured to push against the door of the dishwasher, the rod being movable with respect to the base along said rectilinear direction between a retracted position and an extracted position and the rod and the slider being movable with respect to each other along said rectilinear direction,
    a resilient actuating element operationally arranged between said slider and said rod to resiliently push the rod towards said extracted position,
    a transmission device driven by the electric motor so as to cause the movement of the slider from the rest position into the open position,
    a gearwheel transmission arranged between said electric motor and said transmission device, the gearwheel transmission comprising a gearwheel driven by the electric motor to rotate together with rotation of the electric motor when the electric motor starts rotating, the gearwheel having
        a toothed segment which engages the transmission device with the electric motor to cause the transmission device to be driven by the electric motor for moving the slider from the rest position into the open position, and
        a non-toothed segment which disengages the transmission device from the electric motor when the slider reaches said open position, and
    a resilient recall element arranged so as to recall said slider towards said rest position or recall said rod towards said retracted position when said non-toothed segment disengages the transmission device from the electric motor,
    wherein the slider supports the rod and the resilient actuating element relative to the base.

2. The device as claimed in claim 1, wherein said resilient recall element comprises a helical extension spring arranged between said slider and said base or between said rod and said base.

3. The device as claimed in claim 1, further comprising: a rotary damper mounted on said base and cooperating with a rack formed on said slider or on said rod.

4. The device as claimed in claim 3, wherein the slider envelopes the entirety of the resilient actuating element.

5. The device as claimed in claim 3, wherein the slider envelopes the entirety of the resilient actuating element and a portion of the rod.

6. The device as claimed in claim 3, wherein the transmission device is a gear based device.

7. The device as claimed in claim 3, wherein said transmission device is a rack that moves relative to the rod.

8. The device as claimed in claim 7, wherein the base entirely supports the slider.

9. The device as claimed in claim 3, wherein the device is configured such that the slider and the rod can move relative to the base without compressing the resilient actuating element.

10. The device as claimed in claim 3, wherein the resilient recall element is arranged so as to recall said slider towards said rest position when said non-toothed segment disengages the transmission device from the electric motor.

11. The device as claimed in claim 3, wherein the device is configured such that the slider and the rod can move relative to the base without compressing the resilient actuating element while maintaining a same distance from each other.

12. The device as claimed in claim 3, wherein the resilient recall element is arranged so as to recall said rod towards said retracted position when said non-toothed segment disengages the transmission device from the electric motor.

13. An apparatus, comprising:
    a device for opening a door of a dishwasher, the device including:
        a base,
        an actuator mounted on the base,
        a slider movable with respect to the base along a rectilinear direction between a rest position and an open position,
        a rod having a distal end configured to push against the door of the dishwasher, the rod being movable with respect to the base along said rectilinear direction between a retracted position and an extracted position and the rod and the slider being movable with respect to each other along said rectilinear direction,
        a resilient actuating element operationally arranged between said slider and said rod to resiliently push the rod towards said extracted position, a transmission device driven by the actuator so as to cause the movement of the slider from the rest position into the open position,
a gearwheel transmission arranged between said actuator and said transmission device, the gearwheel transmission comprising a gearwheel driven by the actuator to rotate together with movement of the actuator when the actuator starts moving, the gearwheel having
  a toothed segment which engages the transmission device with the actuator to cause the transmission device to be driven by the actuator for moving the slider from the rest position into the open position, and
  a non-toothed segment which disengages the transmission device from the actuator when the slider reaches said open position, and
a resilient recall element arranged so as to recall said slider towards said rest position or recall said rod towards said retracted position when said non-toothed segment disengages the transmission device from the actuator,
wherein the slider supports the rod and the resilient actuating element relative to the base.

14. The apparatus of claim 8, wherein
the resilient recall element is arranged so as to recall said slider towards said rest position when said non-toothed segment disengages the transmission device from the actuator.

15. The apparatus of claim 8, wherein
the rod is a rectangular-cross-sectioned component as taken in a plane normal to a longitudinal axis of the rod.

16. The apparatus of claim 8, wherein:
a cross-section of the slider taken normal to a longitudinal direction of the rod has a generally rectangular outer periphery.

17. The apparatus of claim 8, wherein:
the resilient recall element is arranged so as to recall said slider towards said rest position when said non-toothed segment disengages the slider from the actuator.

18. The apparatus of claim 8, wherein:
the rod has a maximum diameter at the distal end in a direction normal to a longitudinal axis thereof that is about the same as a maximum diameter of the resilient actuating element in a direction parallel to the direction normal to the longitudinal axis, wherein the resilient actuating element is a coil compression spring.

19. The apparatus of claim 8, wherein:
the resilient recall element is arranged so as to recall said slider towards said rest position automatically from a maximum advancement of the open position when said non-toothed segment disengages the transmission device from the actuator.

20. The apparatus of claim 19, wherein
the recall of said slider recalls the rod towards the retracted position.

21. The apparatus of claim 13, wherein:
the gearwheel transmission is configured to alternately couple and decuple from the transmission device as a result of actuation of the actuator.

22. The apparatus of claim 13, wherein:
the device is a self-contained unit.

23. The apparatus of claim 13, wherein:
said resilient recall element comprises a helical extension spring arranged between said slider and said base or between said rod and said base.

24. The apparatus of claim 13, wherein:
the gearwheel transmission is a speed reducer transmission.

25. The apparatus of claim 13, wherein:
the arrangement of the gearwheel transmission and the transmission device is configured such that continuous rotation of the gearwheel transmission in one direction will repeatedly drive the slider from the rest position to the open position.

26. The apparatus of claim 13, wherein:
the apparatus is configured such that when the slider is at the rest positon and the rod is in the retracted position, at least a substantial portion of the slider is overlapped by the rod when viewed from a direction normal to a longitudinal extension of the rod.

* * * * *